United States Patent [19]
Alexander

[11] 3,886,647
[45] June 3, 1975

[54] METHOD OF MAKING EROSION RESISTANT ARTICLES

[75] Inventor: John A. Alexander, Painesville, Ohio

[73] Assignee: TRW Inc., Cleveland, Ohio

[22] Filed: Apr. 25, 1974

[21] Appl. No.: 464,138

Related U.S. Application Data

[62] Division of Ser. No. 160,342, July 7, 1971, abandoned.

[52] U.S. Cl. .............. 228/175; 228/182; 228/193; 228/263
[51] Int. Cl. ............................................. B23k 31/02
[58] Field of Search............ 29/471.3, 471.7, 472.3, 29/494, 471.1, 504

[56] References Cited
UNITED STATES PATENTS 3,600,103  8/1971  Gray .................................. 416/224
3,649,425  3/1970  Alexander .......................... 161/43
3,748,721  7/1973  Alexander ........................ 29/471.3

*Primary Examiner*—Al Lawrence Smith
*Assistant Examiner*—Margaret M. Joyce
*Attorney, Agent, or Firm*—Hill, Gross, Simpson, Van Santen, Steadman, Chiara & Simpson

[57] ABSTRACT

A method for making an airfoil or the like which involves positioning a first bimetallic sheet in a fixture having a contour corresponding to the desired airfoil contour, with the inner layer of the sheet being made of a metal which is less erosion resistant than the outer layer, positioning on the sheet a metal matrix core assembly, covering the resulting assembly with a second bimetallic sheet, the inner layers of both bimetallic sheets being the same as the matrix metal, welding together the edges of the two sheets to encase the core assembly, and diffusion bonding the metal sheets and core under heat and pressure.

10 Claims, 14 Drawing Figures

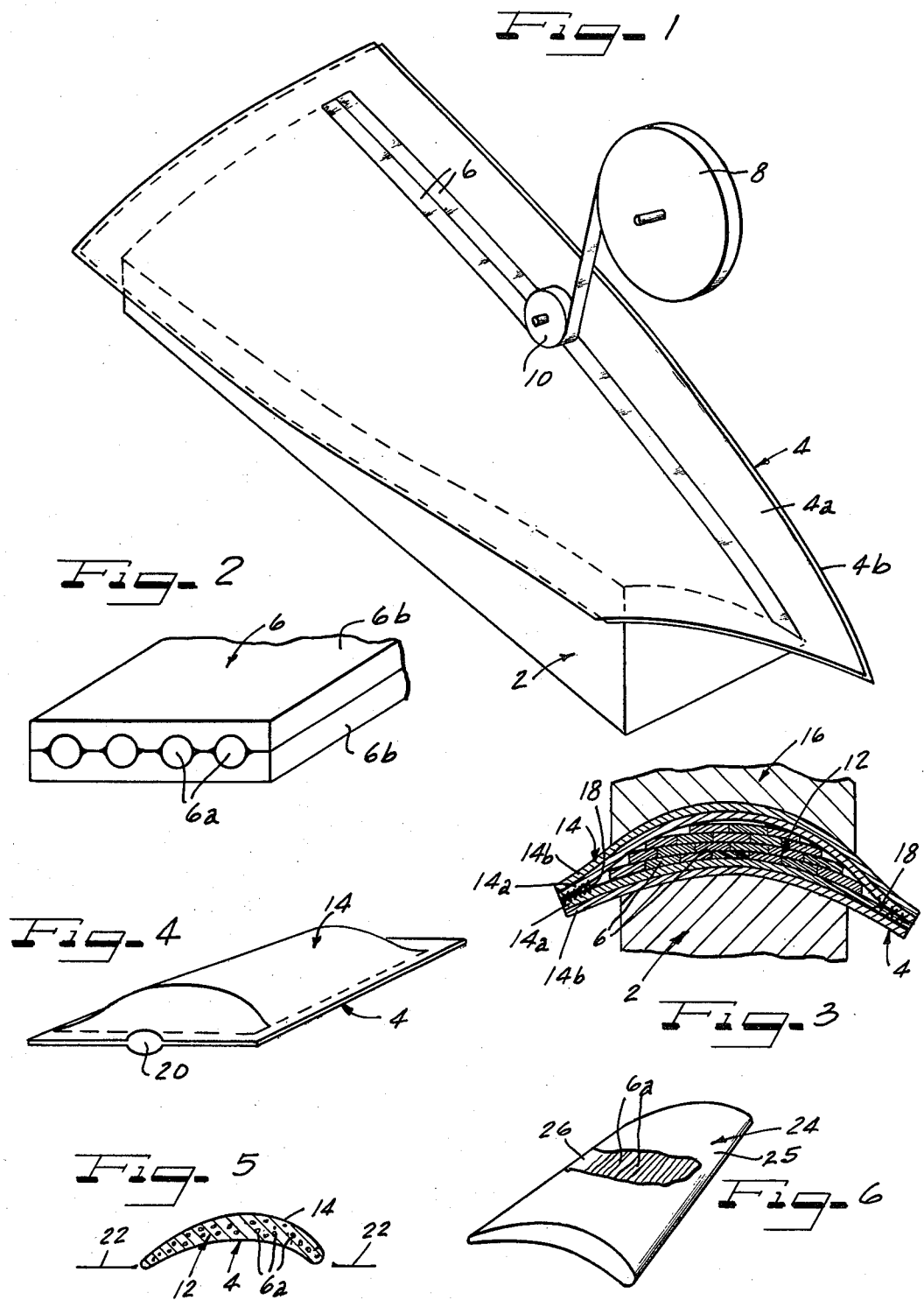

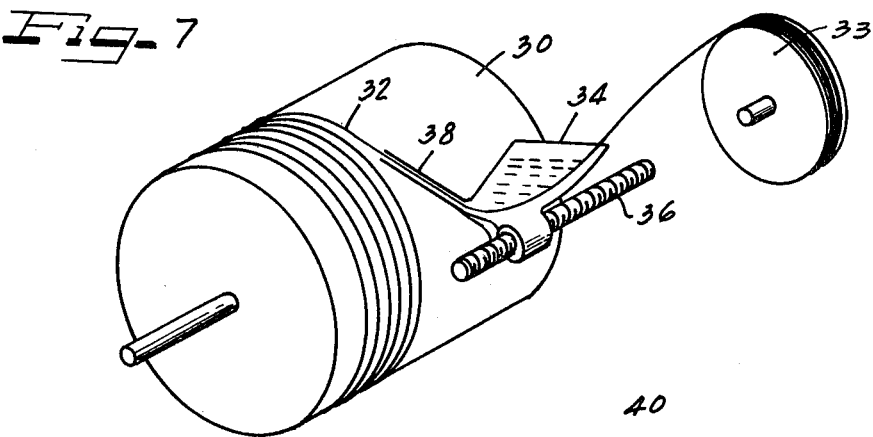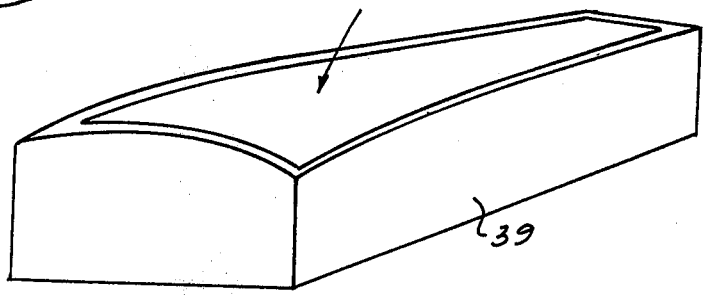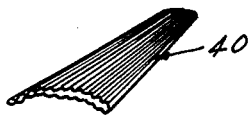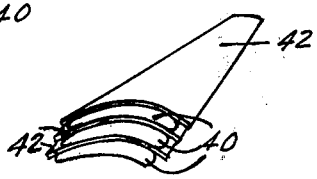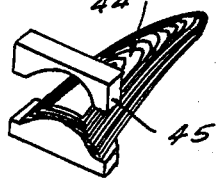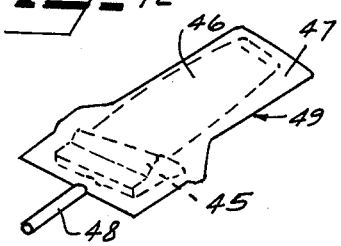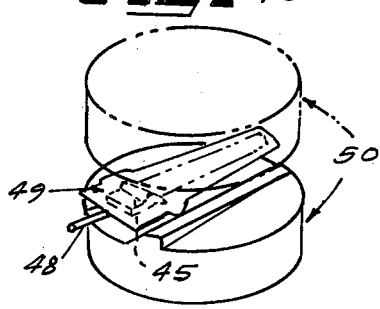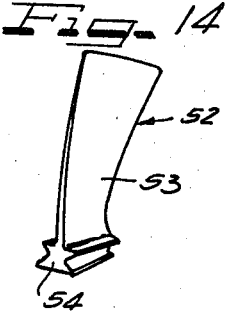

1

METHOD OF MAKING EROSION RESISTANT ARTICLES

REFERENCE TO RELATED APPLICATION

This application is a division of my copending U.S. Ser. No. 160,432 filed July 7, 1971, now abandoned.

BACKGROUND OF THE INVENTION

1. Field of the Invention

This invention is in the field of manufacturing airfoils and blades for turbines or other types of complex shapes in which the core of the airfoil is a filament reinforced metal matrix and the core is combined with two bimetallic sheets which completely surround the core and are bonded together to each other and to the core.

2. Description of the Prior Art

There are numerous descriptions in the prior art of methods of making airfoils, such as that contained in the present applicant's U.S. Pat. No. 3,649,425 issued on Mar. 14, 1972. The disclosure of this patent is incorporated herein by reference. Metal matrices containing reinforcing filaments such as boron are disclosed in the publication Metals Engineering, pages 58 to 63, July, 1968, which publication is also incorporated herein by reference.

SUMMARY OF THE INVENTION

The present invention involves the formation of a dual metal sheath on a metal matrix core formed as set forth in the aforementioned U.S. Pat. No. 3,649,425, or by other methods such as those hereinafter disclosed. The dual sheath consists of an inner metal layer corresponding to the metal of the matrix and an outer metal layer which is more erosion resistant than the inner metal layer.

The method of the present invention consists in first laying a bimetallic sheet on a contoured mandrel or die and then building up a core on the bimetallic sheet from strips of a flexible, consolidated, fiber reinforced metal matrix. As each strip of tape is laid on the surface of the sheet, it is diffusion bonded to the sheet. The tapes are laid side-by-side and layer-upon-layer until a stack of the desired shape and contour is built up. The individual strips of tape are diffusion bonded to each other as the assembly is built up. A covering bimetallic sheet is then put over the core having an inner layer corresponding to the metal of the core and an outer layer of a more erosion resistant metal. Finally, the entire assembly is bonded and consolidated under heat and pressure.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view of a jet engine fan blade in an initial stage of formation;

FIG. 2 is a magnified, fragmentary perspective view of a filament reinforced tape used in making metal matrix cores;

FIG. 3 is a transverse cross-sectional view of a turbine fan blade on a contoured die just before final consolidation by heat and pressure;

FIG. 4 is a perspective view of the turbine blade after complete assembly but before final consolidation;

FIG. 5 is a transverse sectional view of the blade of FIG. 4 illustrating the manner in which flash is cut therefrom;

FIG. 6 is a perspective view of the finished turbine blade with a portion of the sheath removed to show the underlying filament reinforced metal matrix core structure;

FIG. 7 is a perspective view of a winding drum for preparing filament mats for use in making metal matrix lamellae used in constructing airfoil cores;

FIG. 8 is a perspective view of a form block for shaping filament mats into airfoil lamellae;

FIG. 9 shows a filament mat shaped and cut to airfoil shape;

FIG. 10 is a perspective view of a partial stack of filament mats sandwiched between the metal foil lamellae cut to airfoil shape;

FIG. 11 is a perspective view of lamellae assembled on a die before encapsulation with a metal sheath;

FIG. 12 is a perspective view of the encapsulated airfoil assembly including the root member;

FIG. 13 is a perspective view showing the encapsulated airfoil and root member in a hot press; and FIG. 14 shows a finished foil after it has been trimmed and finished.

DESCRIPTION OF THE PREFERRED EMBODIMENTS

In FIG. 1 of the drawings there is shown a contoured mandrel or die 2, the surface of which has the shape of one face of the airfoil, turbine fan blade or other article to be formed. Supported on the surface of the mandrel 2 is a bi-metal base sheet 4. The metal of which the sheet 4 is formed will depend on the metal of the matrix which is used in building up the core. For example, if the core is made of aluminum, the inner layer 4a will be aluminum and the outer layer 4b may be stainless steel or other metal which is more erosion resistant than aluminum. If the matrix is formed of titanium, the inner layer will be of titanium and the outer or exposed layer will be stainless steel.

Flexible, consolidated fiber-reinforced metal matrix tape 6 is fed from a tape supply reel 8 to the contoured surface of the inner base sheet 4. As each strip of tape is laid on the surface of the sheet, it is diffusion bonded to the sheet by means of a resistance heated bonding roller 10. The tapes are laid side-by-side and layer-upon-layer until a stack of the desired shape and contour is built up. If desired, the tapes may also be laid diagonally or crosswise (transversely) and successive layers of the tapes may have the fibers crossplied. The bonding roller 10 bonds each tape to the tape below, thereby preventing shifting of the fibers and compacting the assembly to avoid the bulk of heretofore stacked resin-bonded laminae. Since the tape is laid side-by-side to form the desired shape of each layer, wastage of material is avoided and close dimensional tolerances are maintained.

The width of the tape 6 may vary, depending upon the degree of twist and camber associated with the specific airfoil or other article being formed. Widths of from ⅛ to 1 inch are feasible, with wider tapes being useful where the twist and camber of the article is not appreciable. The tape may contain 25 to 60 volume percent of filament having a diameter of about 4 to 8 mils. Where 4 mil filament is used, the tape may have a thickness of about 5 mils. Where 8 mil filament is used, the tape may be 8 to 10 mils in thickness.

The preferred tape 6 is a fiber reinforced metal matrix composition prepared as shown and described in the article by the present applicant appearing in the aforementioned July, 1968 issue of Materials Engineering. As disclosed in that article, metal matrix tapes are prepared by electro-deposition or by chemical vapor deposition or by plasma spray deposition of the metal on filaments of refractory materials such as boron, boron-silicon carbide, or silicon carbide. The tapes 6 may be composed of one or more layers of filaments 6a sandwiched in the matrix 6b. As shown in FIG. 2, the filaments 6a are in a mono-layer arrangement and run lengthwise of the tape, with the filaments spaced side-by-side and embedded in metal matrix 6b. However, the tape may contain more than one filament layer.

As illustrated in FIG. 3, a body 12 is built up from the tapes 6 on the base sheet 4 to provide the desired thickness and contour of the article being formed. The base bi-metal sheet 4 extends beyond the die or mandrel 2 and a covering bi-metal sheet 14, comprising an inner layer 14a, an outer layer 14b, corresponding, respectively, to the layers of base sheet 4 is then laid over the body 12 with margins of the sheets extending beyond the margins of the core lamellae in order that the edges of the base and cover sheets will be in contact at their edges. The cover sheets preferably have a thickness of about 0.010 to 0.012 inch.

A top mandrel or die 16 contoured to the shape desired for the top face of the airfoil or other article being formed is pressed against the sheet 4 over the body 12. The margins of the sheets 4 and 14 which extend beyond the mandrels 2 and 16 are welded together at 18 to form a sealed envelope around the body 12 except for a small hole or opening 20 in one end of the assembly as shown in FIG. 4.

The body 12 is thus sheathed in a dual or bi-metal foil sealed envelope which is evacuated through opening 20 to remove air and to prevent oxidation in the envelope during final bonding and consolidation. The hole 20 is sealed after the envelope is sufficiently evacuated.

Since the body 12 is composed of consolidated tapes 6 which themselves are partially consolidated by diffusion bonding during the building up of a body on the base sheets 4 and 5, final consolidation of the assembly in the die press between the mandrels or dies 2 and 16 occurs with only a small decrease in volume of the assembly, thereby further protecting against damage or shifting of the filaments 6a.

Bonding for final consolidation of the airfoil or other structure is carried out at temperatures of approximately 900° to 1,800° F depending on the metal used for the matrix at pressures of 5 to 15,000 pounds per square inch for a period of approximately 30 minutes. By using the dual layer foil sheath bonding of the matrix to the sheath can be accomplished under optimum time-temperature conditions.

After the bonding operation, the welded edges of the base and cover sheets are trimmed off as flash 22 as shown in FIG. 5.

As shown in FIG. 6, the finished airfoil 24 has a complete envelope or sheath 25 encasing the consolidated interior body 26 with the filament 6a in the body extending lengthwise of the airfoil.

Although boron filaments are prescribed in the aforementioned article in Materials Engineering as the reinforcing filaments, other types of filaments having the required strength may be used. Likewise, various metals and alloys such as aluminum, titanium, stainless steel, superalloys, such as those disclosed in U.S. Pat. Nos. 3,005,705 and 3,146,136, as well as other refractory metals can be used as the matrix material. It should be understood, however, that the inner metal of the sheath will be the same as the metal from which the matrix is formed. The formation of the metal of the airfoil above described can be performed under control of a computer program providing for tape supply in advance, bonding, welding and shearing.

The bi-metal sheet is produced by diffusion bonding or cladding or rolling operations prior to the shaping operation and the dual bonded layer is applied as the encapsulating sheath. In this way, conditions of time, temperature and pressure optimum for bonding the two metal sheath foils can be used which conditions might be incompatible with the composite core in that they would induce a degrading reaction between the filaments and the matrix.

Another method of manufacturing airfoils with a metal matrix core and a double metallic sheath is illustrated in FIGS. 7 to 14, inclusive. Referring more particularly to FIG. 7, the numeral 30 indicates a winding drum for winding reinforcing filament 32 such as boron, boron-silicon carbide or silicon carbide from a reel 33.

Before the filament 32 is wound onto the drum 30, it is immersed in a bath of liquid binder or resin such as polystyrene contained in the pan 34 mounted on a screw feed 36. The filament is fed to the drum through a nozzle opening 38 of the pan 34. The filament may be spaced by the screw feed so that the strands are wound on the drum at a distance of approximately 5.5 mils from center-to-center for a filament having a diameter of approximately 4.2 mils.

The polystyrene binder holds the filament in desired spaced relationship. After the binder is dried, the mat formed by the filaments embodied in the polystyrene is split and removed from the drum. Mats with any desired number of layers of filaments may be formed. After the mats are removed from the winding drum, they are cut to appropriate size and shaped to a desired airfoil shape by mounting on a form block 39 and placed on a conveyor in an oven electrically preheated to approximately 300°F. The mats may be positioned on the form block and secured in place by positioning pins. A sheet of neoprene rubber having a thickness of approximately 1/16 of an inch is placed over the mat before it passes through the electric oven. As the polystyrene softens, the mat is deformed under the load of the neoprene sheet to conform to the contoured face of the block. The forming of the mat to the contour of the block is completed by placing an aluminum sheet contoured to match the block face, over the rubber sheet as it leaves the oven. The assembly is then cooled by quenching in water after which the aluminum and rubber sheets are removed. A formed mat 40 is illustrated in FIG. 9.

The airfoil section of the composite fan blade is constructed by the layup of plies which are cut to size to build up the airfoil contour. The ply construction includes filament mats 40 shaped as above described sandwiched between metal foil layers 42 compatible with the matrix metal, such as aluminum, titanium, stainless steel or the like. The layers 42 in FIG. 10 are cut and formed to the shape of the mat 40.

A layup of plies composed of alternate layers of mats 40 and foils 42 is then assembled as shown in FIG. 11 with the plies cut to the proper contours. The less than full length foil plies extend beyond the edges of the corresponding filament mat plies to minimize slippage and bunching. A stack 44 shown in FIG. 11 is thereby produced.

Metal root blocks 45 are then placed over one end of the stacked lamellae as shown.

Bi-metal contoured sheathing sheets 46 are than placed over and under the lamellae stack 44 and the root blocks 45 and have their peripheral edges welded together as shown at 47. An exhaust tube is also secured to the root end of the envelope to evacuate the envelope. The welded envelope assembly 49 of FIG. 12 is thus produced.

The outer surfaces of the covering sheath 46 are preferably sandblasted and coated with a parting compound such as a mixture of graphite and boron nitride. The assembly is then placed in a hot press die 50 shown in FIG. 13. In the hot press, the entire blade is consolidated by diffusion bonding under heat and pressure. The temperature is first raised to approximately 700°F, where it is held constant in order to volatilize the polystyrene bonding material used in preparing the filament mats. The envelope is subjected to a vacuum of approximately 100 microns during the maximum volatilization period. When the pressure within the envelope reaches 30 microns, the polystyrene is substantially completely removed and the die is heated to the bonding temperature for the particular matrix of which the core is formed. The pressing load is applied in increments of about 2 minutes apart until the desired bonding load of 5,000 to 15,000 pounds per square inch is reached. This pressure is applied at the bonding temperature for approximately thirty minutes, after which the press is allowed to cool for removal of the airfoil.

The hot press die is preferably heated by induction heating with a 60 cycle 125 KW heating unit. The finished airfoil 52 will then have the appearance shown in FIG. 14.

Where stainless steel is used as the outer sheath and aluminum or titanium is used as the inner sheath and matrix metal, the bonding temperature may be of the order of 1,000° to 1,650°F.

As shown in FIG. 14, a finished airfoil fan blade 52 is formed by suitable machining of the assembly 49 removed from the press 50. This finished airfoil blade has a vane or airfoil portion of any desired length illustrated at 53 and a root portion at one end thereof illustrated at 54 integrally bonded to the vane section and machined to lock into a mounting slot for the blade. It will, of course, be appreciated that the block sections 45 forming the root 54 are integrally welded together and bonded to the ends of the plies.

The sandwiching of the metal foil between the filament mats rigidifies the airfoil section without increasing the weight thereof because the foils are very thin and lightweight, being on the order of 0.025 inch thick.

From the foregoing, it will be appreciated that the method of the present invention provides lightweight, high temperature resisting strong composite articles especially suited for fan blades in turbo jet engines.

It will be understood that various modifications can be made to the described embodiments without departing from the scope of the present invention.

I claim as my invention:

1. The method of making a shaped article which comprises positioning a first bi-metal sheet in a shaping means having a contour corresponding to the desired shape, the inner layer of said shape being made of metal less erosion resistant than the outer layer, forming a metal matrix core assembly over that first bi-metal sheet, covering the assembly with a covering sheet of the same type as said first bi-metal sheet, the inner layer of said bi-metal sheets corresponding to said matrix metal, welding together the edges of the first sheet and the covering sheet to encase the core assembly, and diffusion bonding said metal sheets and core under heat and pressure.

2. The method of claim 1 in which each bi-metal sheet consists of an inner layer of aluminum and an outer layer of stainless steel.

3. The method of claim 1 in which each bi-metal sheet has an inner layer composed of titanium and an outer layer of stainless steel.

4. The method of making an airfoil structure which comprises positioning a first bi-metal sheet in a shaping die, applying strips of a tape of fiber reinforced metal matrix in side-by-side relation and in overlying layers over said first bi-metal sheet to build up a desired contour for the core of said airfoil structure, diffusion bonding said strips to said first bi-metal sheet and to each other as the buildup of strips progresses, applying a second bi-metal sheet to the resulting diffusion bonded assembly, each of said bi-metal sheets having an inner surface composed of the matrix metal and an outer surface composed of a more erosion resistant metal, bonding the edges of the two bi-metal sheets together about the periphery of said core, and diffusion bonding the entire structure so produced under heat and pressure.

5. The method of claim 4 in which said inner surface consists of aluminum and said outer surface consists of stainless steel.

6. The method of claim 4 in which said inner surface is composed of titanium and said outer surface is composed of stainless steel.

7. A method as set forth in claim 1 in which the core assembly is constructed by alternately stacking metal foil sheets and filament mats cut and shaped to produce the desired airfoil contour.

8. A method in accordance with claim 7 in which the filament mats are preformed by bonding together reinforcing filaments in spaced relation by means of a synthetic resin and thereafter cutting and deforming the same to the required size and shape.

9. The method of claim 8 in which each of said mats is edge-welded to a metal foil sheet prior to stacking.

10. The method of claim 1 in which the encased core assembly is evacuated before the final diffusion bonding of the metal sheets and the core.

* * * * *